United States Patent
Claessen

(10) Patent No.: US 7,095,794 B2
(45) Date of Patent: Aug. 22, 2006

(54) METHODS AND APPARATUS FOR A SPREAD SPECTRUM MODULATED BACKSCATTER ELECTRONIC SHELF LABEL SYSTEM

(75) Inventor: Albertus Maria Gerardus Claessen, Oakwood, GA (US)

(73) Assignee: NCR Corporation, Dayton, OH (US)

( * ) Notice: Subject to any disclaimer, the term of this patent is extended or adjusted under 35 U.S.C. 154(b) by 648 days.

(21) Appl. No.: 10/036,218

(22) Filed: Oct. 23, 2001

(65) Prior Publication Data

US 2003/0076892 A1    Apr. 24, 2003

(51) Int. Cl.
*H04L 27/10* (2006.01)
*H04B 1/69* (2006.01)

(52) U.S. Cl. ...................... 375/282; 375/130
(58) Field of Classification Search ............... 375/282, 375/133, 130; 455/45, 63, 73; 343/6.5; 340/325.4, 571
See application file for complete search history.

(56) References Cited

U.S. PATENT DOCUMENTS

| | | | |
|---|---|---|---|
| 5,640,683 A * | 6/1997 | Evans et al. .................. 455/45 |
| 5,649,296 A * | 7/1997 | MacLellan et al. ........... 455/39 |
| 5,828,693 A | 10/1998 | Mays et al. |
| 5,873,025 A | 2/1999 | Evans et al. |
| 6,005,903 A | 12/1999 | Mendelovicz |
| 6,064,690 A | 5/2000 | Zhou et al. |
| 6,108,367 A * | 8/2000 | Herman et al. ............. 375/141 |
| 6,160,803 A | 12/2000 | Yuen et al. |
| 6,650,230 B1 * | 11/2003 | Evans et al. ............... 340/10.4 |
| 2002/0149484 A1 * | 10/2002 | Carrender ................ 340/572.4 |

FOREIGN PATENT DOCUMENTS

EP    0 915 573 A    5/1999

OTHER PUBLICATIONS

Dixon, Robert C., "Spread Spectrum Systems with Commercial Applications," 3rd edition, pp. 60-113, John Wiley & Sons, Inc.
Aether Wire & Location IC: "Wireless Adaptive, Mobile Information Systems", Wireless, Adaptive, Mobile Information Systems, Jul. 1995, XP002306888, USA, p. 10, pp. 23-24.

* cited by examiner

*Primary Examiner*—Khai Tran
(74) *Attorney, Agent, or Firm*—Priest & Goldstein, PLLC

(57) ABSTRACT

Techniques for an electronic shelf label (ESL) system which uses a digital modulation technique for a modulated backscatter uplink from an ESL to a communication base station (CBS) which utilizes pseudo-random sequences instead of a single continuous wave frequency. The CBS transmits a message to an ESL using a Manchester coded amplitude modulated carrier. After receiving the message, the ESL responds by reflectively modulating a continuous wave (CW) signal with a pseudo-random code sequence. Multiple pseudo-random code sequences may be chosen, with each code sequence corresponding to a particular response. The code sequence is modulated onto a kHz carrier which is used to reflectively modulate the CW signal received from the CBS. The CBS then receives the reflectively modulated signal and correlates the received signal to determine message transmitted.

33 Claims, 6 Drawing Sheets

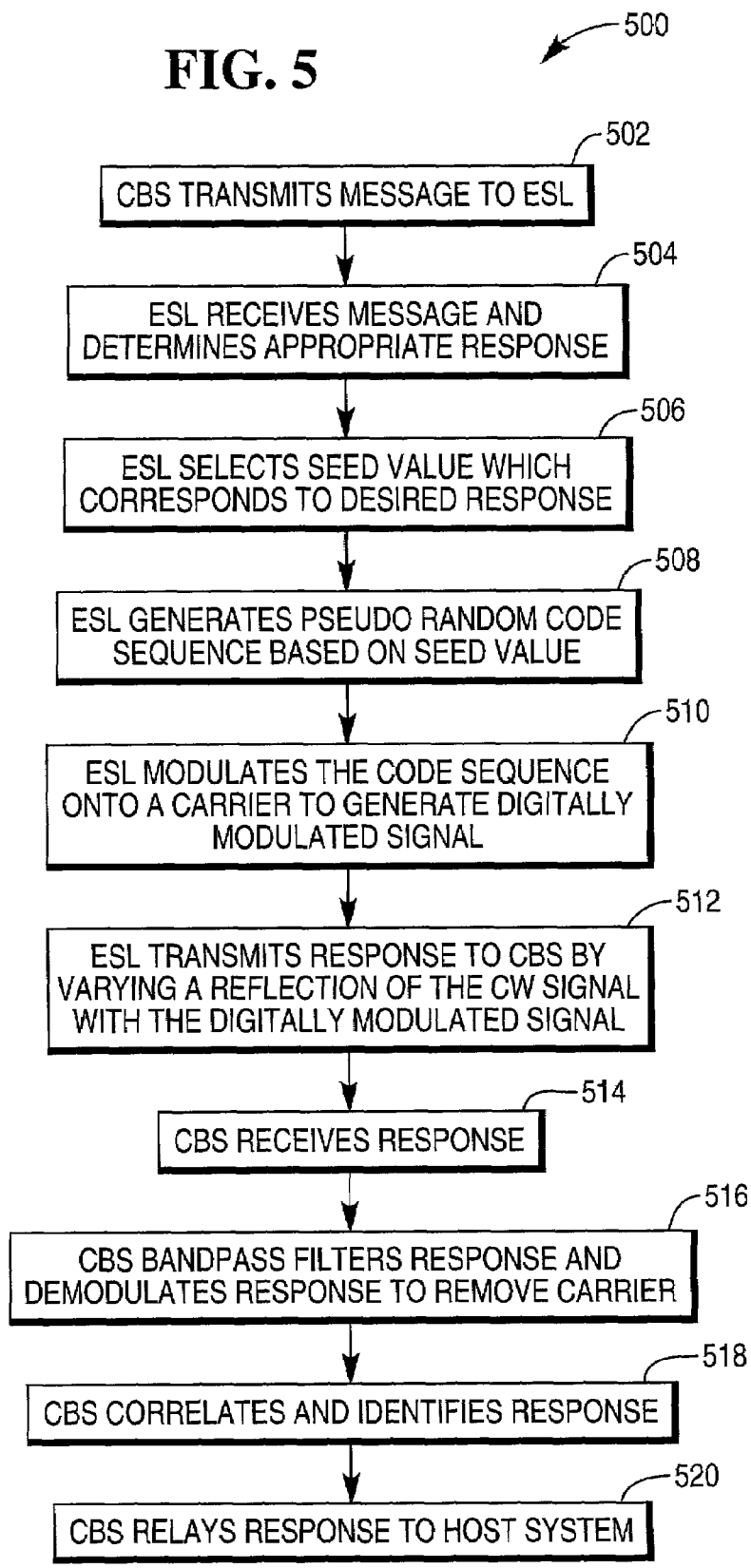

METHODS AND APPARATUS FOR A SPREAD SPECTRUM MODULATED BACKSCATTER ELECTRONIC SHELF LABEL SYSTEM

FIELD OF THE INVENTION

The present invention relates generally to improvements in electronic shelf label (ESL) systems used in transaction establishments. More specifically, the present invention relates to a spread spectrum modulated backscatter ESL system.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. Price information displayed by the ESLs is obtained from a price look-up (PLU) data file. The central server sends messages, including price change messages, to the ESLs through a communications base station (CBS).

One presently available ESL system uses wireless communications to communicate from the CBS to an ESL. In such an approach, the communication from the CBS to the ESL, the downlink, uses amplitude modulated Manchester coded data. For communication from the ESL to the CBS, the uplink, a continuous carrier wave transmitted by the CBS that is remodulated by the ESL and reflected back to the CBS may be utilized. This technique is known as modulated backscatter or remodulated carrier wave (CW). In such a system, the uplink communication is only used for an ESL to acknowledge receipt and correct execution of the message received by the ESL. The uplink information may be modulated as a single continuous frequency lasting 360 milliseconds (ms), for example. Only a limited number of different modulating frequencies are available for the uplink. Application software infers the status of the ESL from a sequence of interrogation messages to which the ESL either responds with an acknowledgment or does not respond at all, allowing the CBS to determine memory integrity, broken display glass or battery condition, push button depression, or the like.

SUMMARY OF THE INVENTION

The present invention advantageously provides methods and apparatus for an improved ESL system which uses a digital modulation technique for a modulated backscatter uplink from the ESL which utilizes pseudo-random sequences instead of a single continuous wave frequency. In a preferred embodiment, the CBS transmits a message to an ESL using a Manchester coded amplitude modulated carrier. After receiving the message, the ESL responds by reflectively modulating a continuous wave (CW) signal with a pseudo-random code sequence. The CW signal is transmitted by the CBS during an uplink phase or timeslot. Multiple pseudo-random code sequences may be chosen, with each code sequence corresponding to a particular response. In one aspect, the code sequence is modulated onto a 32.768 kHz carrier which is used to reflectively modulate the CW signal received from the CBS. The CBS then receives the reflectively modulated signal and correlates the received signal to determine the message transmitted.

In a preferred embodiment, the code, or chip, rate is 16.384 kHz, which results in a spectrum 32.768 kHz wide around the 32.768 kHz carrier, with the −3dB bandwidth around the carrier being 16.384 kHz. With a code length of 511 chips, the resulting data rate is 32.062 bits per second, allowing multiple bits to be transmitted in one acknowledgement during the slot available for responses from the ESL.

By modulating the codes onto the 32.768 kHz carrier, the remodulated spectrum of the response is centered around this frequency, allowing the CBS receiver to use a bandpass filter centered around this frequency which eliminates the need for DC coupling in the CBS receiver and minimizes noise in the CBS receiver. For example, phase noise in the receiver is lower at frequencies over 10 kHz, impulse noise generated by fluorescent lights is lower at higher frequencies, and Schott noise is insignificant at higher frequencies.

A more complete understanding of the present invention, as well as further features and advantages of the invention, will be apparent from the following detailed description and the accompanying drawings.

BRIEF DESCRIPTION OF THE DRAWINGS

FIG. 5 shows a method of communicating with an ESL in accordance with the present invention.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
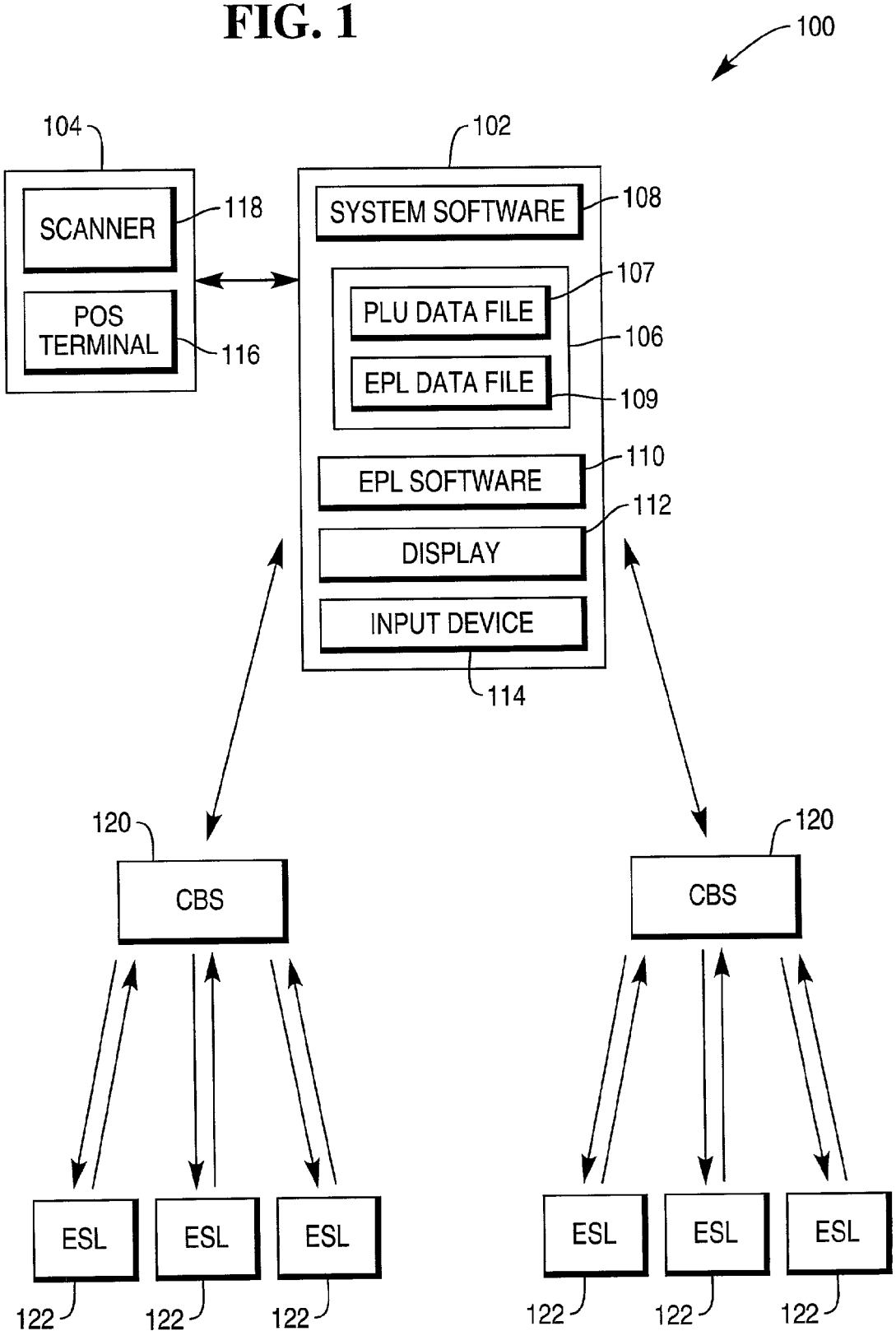
FIG. 1 is a block diagram of a transaction management system in accordance with the present invention.

FIG. 1 shows a transaction management system 100 in accordance with the present invention. The system 100 includes a host computer system 102 and a point-of-service (POS) system 104. Here, components 102 and 104 are shown as separate components that are networked together, but they and their subcomponents may also be combined or divided in various ways. Thus, host computer system 102 may be a POS terminal which doubles as a host computer for a network of other POS terminals.

The host computer system 102 includes a storage medium 106, system software 108, ESL software 110, a display 112 and an input device 114. The storage medium 106 includes a PLU data file 106 which stores item prices which are available for distribution to a POS terminal 116 by the host system 102. Alternatively, provision may be made for a bar code scanner 118 to directly access the PLU data file 106. The storage medium 106 also includes ESL data file 109 which contains item information, such as a PLU number and ESL identification information for each of the ESLs 122. The system 102 executes system software 108 which updates the contents of storage medium 106 and performs various system functions. Input device 114 is preferably a keyboard, but it will be recognized that data can be entered in a variety of alternative manners.

POS system 104 includes bar code scanner 118 and POS terminal 116.

The system 100 also includes communication base station (CBS) units 120 and ESLs 122. The CBS units 120 may be suitably mounted in or near the ceiling of the retail establishment. ESLs 122 are typically attached to store shelving adjacent to items.

ESL software 110 records, schedules, and transmits all messages to ESLs 122. ESL software 110 transmits messages, including price change messages, to ESLs 122 utilizing the CBS units 120 which are placed periodically across a ceiling. These messages are sent from the host system 102 to the CBS units 120 utilizing radio frequency (RF) communication, IR communication, a wired link, or some combination of communication techniques.

After receiving a message from the host system 102, the CBS units 120 then transmit the message to the ESLs 122 using a Manchester coded amplitude modulated carrier. ESLs 122 then receive the message and take the appropriate action. For example, if the message is a price change message addressed to a particular ESL 122, that ESL 122 would decode the message and update the price displayed. After receiving the message, the ESL 122 then transmits an acknowledgement to the CBS 120, as described in greater detail below.

The CBS units 120 may be grouped along the ceiling such that there is an overlapping zone of coverage for each ESL 122. In other words, each ESL 122 would be within reception range of at least two CBS units 120.

Figure 2:
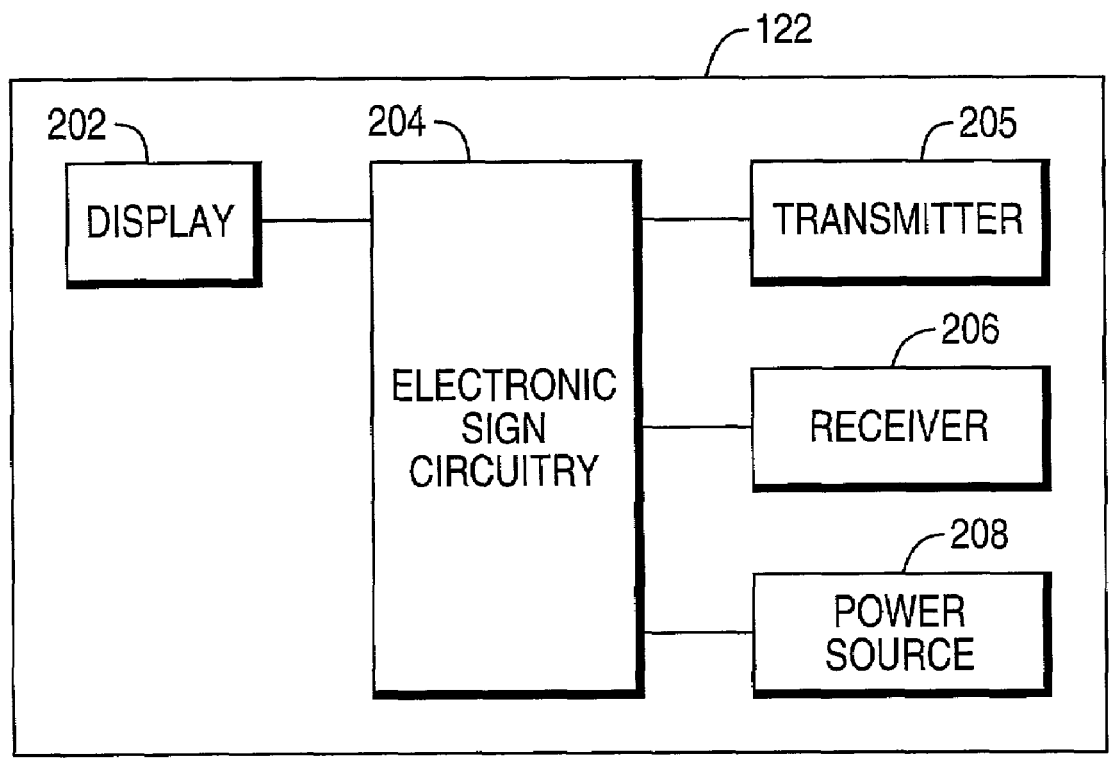
FIG. 2 is a block diagram of an ESL in accordance with the present invention.

FIG. 2 shows a block diagram of the ESL 122 in accordance with the present invention. A display 202 displays information, such as item price and related data. ESL 122 includes a transmitter 205, described in greater detail below, and a receiver 206 for transmitting messages and receiving messages, respectively. A power source 208 provides power for the operation of ESL 122. Power may be provided by a battery, solar cell, an external source, or other suitable techniques. The operation of ESL 122 is controlled by ESL circuitry 204. ESL circuitry 204 decodes incoming messages received, and performs any actions indicated by the messages. For example, if a price change message is received, the ESL circuitry 204 would cause the display 202 to be updated with the new price information and initiate an acknowledgement to be transmitted by the transmitter 205. ESL circuitry 204 may also include a variety of components, such as memory, timers and other components.

Figure 3:
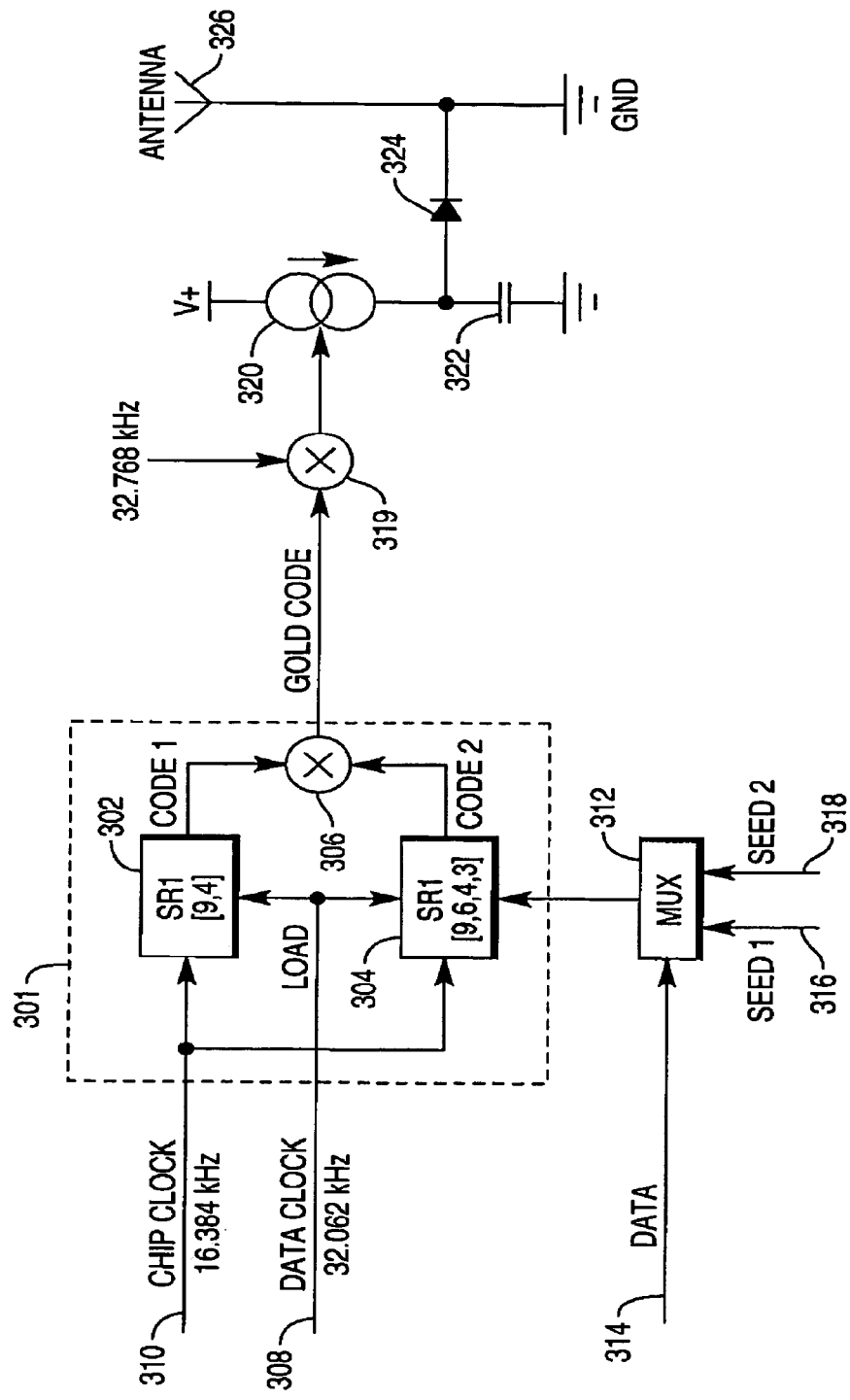
FIG. 3 is a circuit diagram of an ESL transmitter in accordance with the present invention.

FIG. 3 shows a detailed view of the ESL transmitter circuit 205 in accordance with the present invention. An ESL in accordance with the present invention transmits pseudo random code sequences to the CBS 120, with each code sequence corresponding to a particular response. The ESL transmitter circuit 205 includes a Gold code generator 301 which comprises shift registers 302 and 304, and a modulo 2 adder 306. The shift registers 302 and 304 may each suitably be implemented as a minimum length pseudo random code generator. Further details of Gold code generation may be found in *Spread Spectrum Systems with Commercial Applications*, Third Edition, by Robert C. Dixon, which is incorporated by reference herein in its entirety.

A data clock input 308 controls the loading of the shift registers 302 and 304. A chip clock input 310 provides the chip rate. While in a preferred embodiment the data clock input 308 and the chip clock input 310 operate at 32.062 Hz and 16.384 kHz, respectively, other frequencies may be used without departing from the teachings of the present invention. A multiplexer 312 provides a seed value for the shift register 304 and is controlled by a data input 314 which determines if a first seed value 316 or a second seed value 318 is loaded into the shift register 304.

In order to respond to a message transmitted from the CBS 120, the ESL circuitry 204 selects a seed value which corresponds to a data sequence to be sent to the CBS 120. For example, a "1" data bit may correspond to the first seed value 316 and a "0" data bit may correspond to the second seed value 318. The seed values are selected to provide optimal auto correlation and cross correlation properties. The seed value is then loaded into shift register 304. The outputs of the shift registers 302 and 304 are added modulo 2 by the adder 306 to produce a pseudo random code sequence, such as a Gold code. The code sequence is called "pseudo random" because it is not true Gaussian noise. As an example, shift register 302 may be seeded with the value 511 for both a positive acknowledgement (ACK) and a negative acknowledgement (NACK). Shift register 304 may be seeded with the value 223 for ACK and the value 208 for NACK.

The pseudo random code sequence is modulated onto a digital carrier, such as a 32.768 kHz carrier, by a modulator 319 to produce a digitally modulated signal which controls a current source 320. The current source 320 is connected to a capacitor 322 and a diode 324. The diode 324 is connected to an antenna 326.

The digitally modulated signal causes current source 320 to modulate the diode 324 and remodulate a continuous wave (CW) signal received from the CBS 120. Energy reflected by the antenna 326 is a function of the mismatch of antenna impedance and load impedance. The load impedance is modulated by varying the current source 320, which in turn varies the current through the diode 324. The load impedance is thus varied, or modulated, by the pseudo random code sequence signal.

In a preferred embodiment the code, or chip, rate is 16.384 kHz, which results in a spectrum 32.768 kHz wide around the 32.768 kHz carrier. With a code length of 511 chips, the resulting data rate is 32.062 bits per second. The higher data rate allows multiple bits transmitted in one acknowledgement during the 360 ms slot available for responses from the ESL. A "chip" is defined as the time it takes to transmit a single bit of the pseudo random code.

Figure 4A:
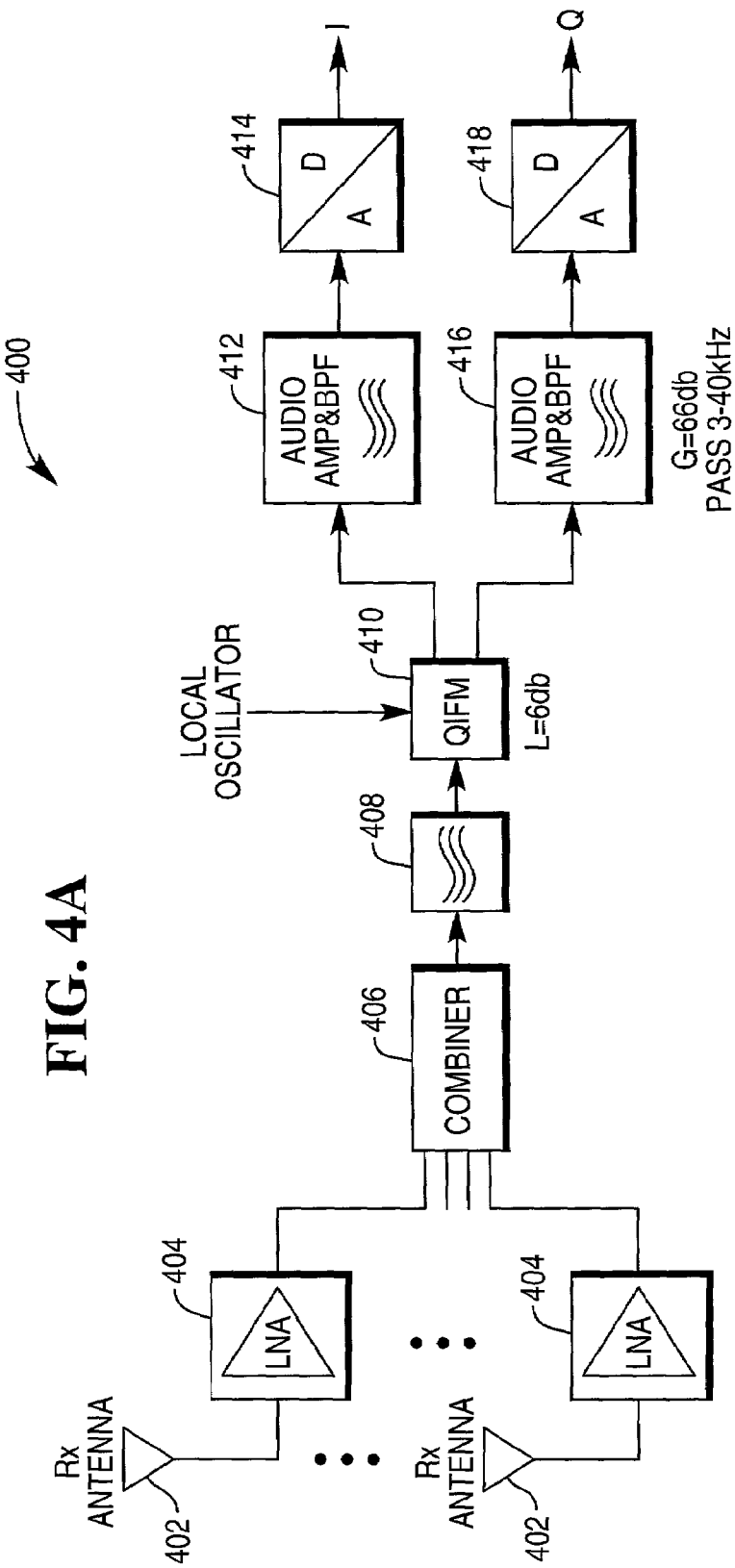
FIGS. 4A and 4B show a circuit diagram of a CBS receiver in accordance with the present invention.

FIG. 4A shows a first stage 400 of a CBS receiver in accordance with the present invention. A plurality of receive antennas 402 are connected to a combiner 406 through a plurality of low noise amplifiers (LNAs) 404. The output of the combiner 406 passes through an RF bandpass filter 408 before entering a quadrature intermediate frequency demodulator (QIFM) 410. The bandpass filter may suitably pass frequencies in the 24.567 kHz to 40.960 kHz range. The QIFM 410 is operated by a 2.4 GHz CW signal and removes the RF signal to provide two baseband outputs, an in-phase (I) baseband output signal and a quadrature baseband (Q) output signal, with the I signal being 90° out of phase from the Q signal. The I signal passes through an audio amplifier and band pass filter 412 before being converted into a digital I signal by an analog to digital (A/D) converter 414. The Q signal passes through an audio amplifier and band pass filter 416 before being converted into a digital signal by an analog to digital (A/D) converter 418. The audio amplifiers and band pass filters 414 and 416 may suitably operate with a gain of 66 dB and a bandpass frequency range of 24.576 kHz to 40.960 kHz. The digital I and Q signals are then passed to a receiver digital signal processor (DSP), as described in greater detail below.

Figure 4B:
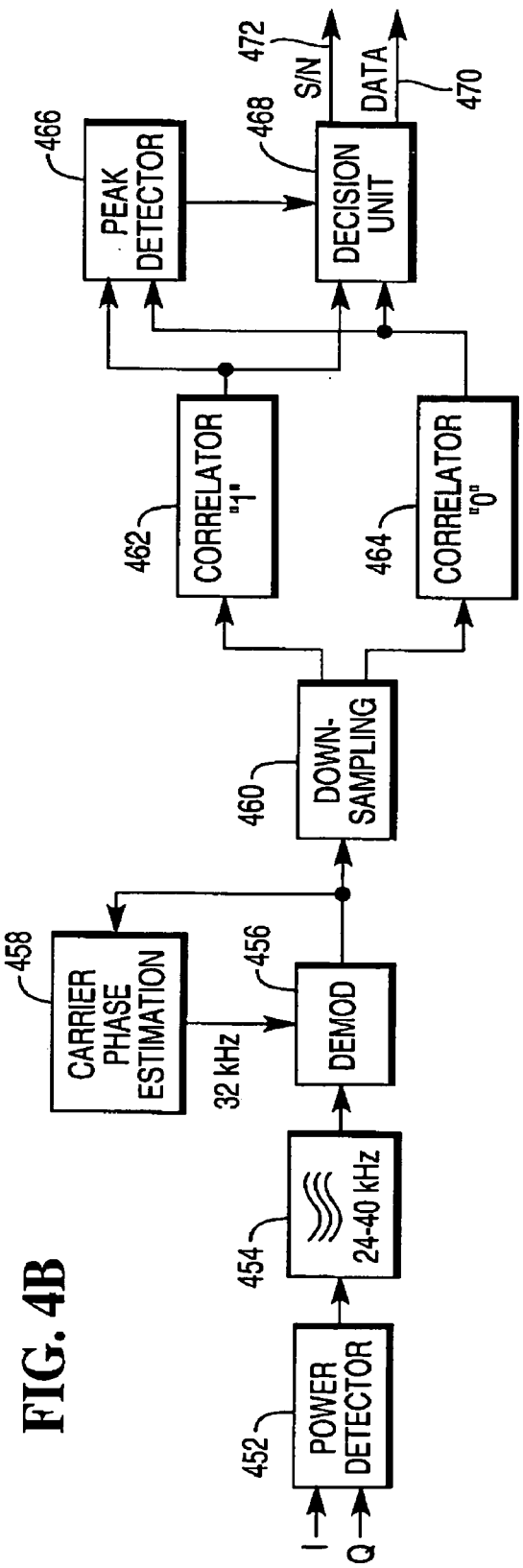

FIG. 4B shows a second stage 400' of a CBS receiver in accordance with the present invention. In a presently preferred embodiment, the second stage 400' is implemented utilizing a DSP. While the following description refers to the elements of stage 400' as separate functional blocks it will be recognized that in the preferred embodiment these blocks will preferably be implemented within the DSP. It will be recognized that various circuit implementations may be employed for some blocks in the DSP. As shown in FIG. 4B, the digital I and Q signals are received by a power detector 452 which converts these signals into an amplitude modulated signal which is passed through a band pass filter 454 which substantially removes frequency components outside the 24-40 kHz band. A demodulator 456 in conjunction with a carrier phase estimator 458 then removes the 32.768 kHz CW signal that was originally used in the ESL to modulate the pseudo random Gold codes. The output of the demodulator 456 then passes through a down-sampling block 460 which reduces the number of digital samples. The output of the down-sampling block 460 is transmitted to a first correlator 462 and a second correlator 464. The first correlator 462 correlates the received signal with a code sequence corresponding to the "1" data bit, while the second correlator 464 correlates the received signal with a code sequence corresponding to the "0" data bit. The outputs of the correlators 462 and 464, which indicate how accurate a match occurred between the incoming signal and a "0" or a "1", is then passed to a peak detector 466 and a decision unit 468. The peak detector 466 and the decision unit 468 then determine the signal to noise ratio of the received signal which provides an estimate of the error probability in the uplink communication. The signal to noise ratio can be used to set a threshold for accepting the uplink communication and setting the reliability of the uplink communication. If the decision unit 468 determines that a valid "0" or "1" was received, an indication of the "0" or "1" signal is then output on data output 470 for transmission to the host system. The signal to noise ratio of the received signal may also be output on signal 472 for further processing if desired. In a preferred embodiment, the peak detector 466 looks for peaks at specific times corresponding to the time slots used by ESLs in responding to messages. Additionally, interference from fluorescent lights can be minimized by providing additional filtering algorithms on the DSP.

In another aspect, additional seed values may be utilized to provide for additional states beyond simply "0" or "1", such as "2", "3", and so on. Additionally, the EPLs in a retail establishment may be grouped, with each group responding to a different CBS and utilizing different seed values.

FIG. 5 shows a method 500 of communicating with an ESL, such as ESL 122, in accordance with the present invention. In step 502, a CBS, such as CBS 120, transmits a message to the ESL using a Manchester coded amplitude modulated carrier. The CBS also begins transmitting a continuous wave (CW) signal during an uplink timeslot. In step 504, the ESL receives the message and determines the appropriate response. In step 506, the ESL selects a seed value which corresponds to the desired response. Next, in step 508, the ESL generates a pseudo random code sequence based on the seed value. In step 510, the ESL modulates the pseudo random code sequence on a carrier, such as 32.768 kHz, to generate a digitally modulated signal. In step 512, the ESL transmits the response to the CBS by varying a reflection of the CW signal with the digitally modulated signal. In step 514, the CBS receives the response. In step 516, the CBS filters the response and demodulates the response to remove the carrier. In step 518, the CBS correlates the response to identify the response. In step 520, the CBS relays the response to the host system.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

I claim:

1. An electronic price label (ESL) system comprising:
an ESL receiving a message transmitted from a communications base station (CBS), the ESL including a transmitter having a generator for producing a pseudo-random code sequence, the transmitter transmitting a response to the message by reflectively modulating a continuous wave (CW) signal with the pseudo-random code sequence so as to impose the pseudo-random code sequence on the continuous wave signal; and
the CBS receiving and correlating the reflectively modulated CW signal.

2. The ESL system of claim 1 wherein the CW signal is transmitted by the CBS during a time period in which the ESL responds.

3. The ESL system of claim 1 wherein the pseudo-random code sequence is selected by the ESL from a plurality of pseudo-random code sequences to correspond to a particular response.

4. The ESL system of claim 1 wherein the pseudo-random code sequence is modulated onto a carrier, the carrier reflectively modulating the CW signal received from the CBS.

5. The ESL system of claim 3 wherein the carrier oscillates at about 32 kHz.

6. The ESL system of claim 3 wherein the response exhibits a remodulated spectrum centered around the carrier.

7. The ESL system of claim 1 wherein the message is transmitted to the ESL using a Manchester coded amplitude modulated earner.

8. The ESL system of claim 1 wherein the message includes a command instructing the ESL to perform an action and the response includes an acknowledgement indicating the ESL successfully performed the action.

9. The ESL system of claim 1 wherein the ESL selects a seed value corresponding to the response.

10. The ESL system of claim 9 wherein the ESL generates the pseudo-random code sequence based on the seed value.

11. The ESL system of claim 10 wherein the ESL modulates the code sequence onto a carrier to generate a digitally modulated signal.

12. The ESL system of claim 11 wherein the ESL transmits the response by varying a reflection of the CW with the digitally modulated signal.

13. The ESL system of claim 12 wherein the CBS bandpass filters the response and performs demodulation to remove the carrier.

14. The ESL system of claim 13 wherein the CBS correlates the response.

15. The ESL system of claim 14 wherein the CBS relays the response to a host system for identification.

16. An electronic shelf label (ESL) communication method comprising the steps of:
  transmitting a message to an ESL from a communications base station (CBS);
  generating a pseudo-random code sequence at the ESL;
  transmitting a response by the ESL to the message by reflectively modulating a continuous wave (CW) signal with the generated pseudo-random code sequence so as to impose the pseudo-random code sequence onto the continuous wave signal; and
  receiving and correlating the reflectively modulated CW signal by the CBS.

17. The method of claim 16 further comprising the step of:
  selecting a seed value corresponding to the response by the ESL.

18. The method of claim 17 further comprising the step of:
  generating the pseudo-random code sequence based on the seed value by the ESL.

19. The method of claim 18 further comprising the step of:
  modulating the code sequence onto a carrier to generate a digitally modulated signal by the ESL.

20. The method of claim 19 further comprising the step of:
  transmitting the response by varying a reflection of the CW signal with the digitally modulated signal.

21. The method of claim 20 further comprising the steps of:
  bandpass filtering the response; and
  performing demodulation to remove the carrier.

22. The method of claim 21 further comprising the step of:
  correlating the response.

23. The method of claim 22 further comprising the step of:
  relaying the correlated response to a host system for identification.

24. An electronic price label (ESL) comprising:
  an ESL receiving a message transmitted from a communications base station (CBS), the ESL including a transmitter having a generator for producing a pseudo-random code sequence, the transmitter transmitting a response to the message by reflectively modulating a continuous. wave (CW) signal with the pseudo-random code sequence so as to impose the pseudo-random code sequence onto the continuous wave signal.

25. The ESL of claim 24 wherein the CW signal is transmitted by the CBS during a time period in which the ESL responds and the CBS receives and correlates the reflectively modulated CW signal.

26. The ESL of claim 24 wherein the pseudo-random code sequence is selected by the ESL from a plurality of pseudo-random code sequences to correspond to a particular response.

27. The ESL of claim 24 wherein the pseudo-random code sequence is modulated onto a carrier, the carrier reflectively modulating the CW signal received from the CBS.

28. The ESL of claim 24 wherein the message is transmitted to the ESL using a Manchester coded amplitude modulated carrier.

29. The ESL of claim 28 wherein the message includes a command instructing the ESL to perform an action and the response includes an acknowledgement indicating the ESL successfully performed the action.

30. The ESL of claim 24 wherein the ESL selects a seed value corresponding to the response.

31. The ESL of claim 30 wherein the ESL generates the pseudo-random code sequence based on the seed value.

32. The ESL of claim 31 wherein the ESL modulates the code sequence onto a carrier to generate a digitally modulated signal.

33. The ESL of claim 32 wherein the ESL transmits the response by varying a reflection of the CW with the digitally modulated signal.

* * * * *

UNITED STATES PATENT AND TRADEMARK OFFICE
CERTIFICATE OF CORRECTION

PATENT NO. : 7,095,794 B2  Page 1 of 1
APPLICATION NO. : 10/036218
DATED : August 22, 2006
INVENTOR(S) : A. M. G. Claessen It is certified that error appears in the above-identified patent and that said Letters Patent is hereby corrected as shown below:

Column 6, Line 45, after "modulated" delete "earner" and substitute --carrier--

Signed and Sealed this

Twenty-sixth Day of May, 2009

JOHN DOLL
*Acting Director of the United States Patent and Trademark Office*